Figure 4:
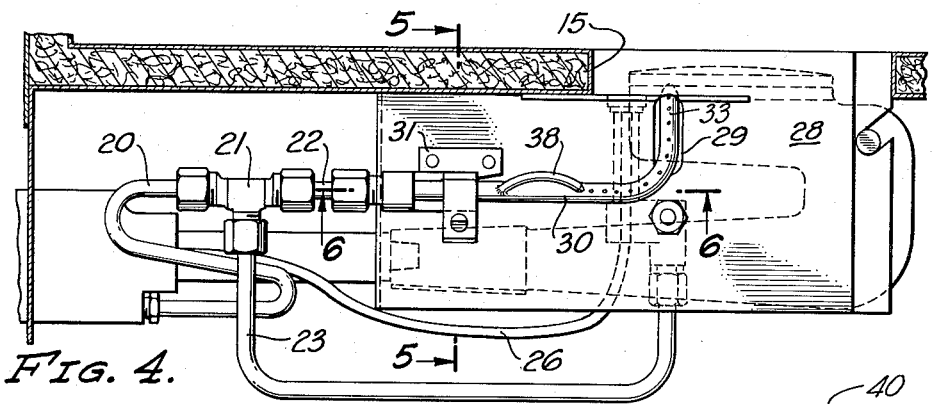

Aug. 22, 1961     J. W. BOLD     2,997,040
PILOT FOR GAS OPERATED HOT FOOD TABLES
Filed March 30, 1959     2 Sheets-Sheet 1
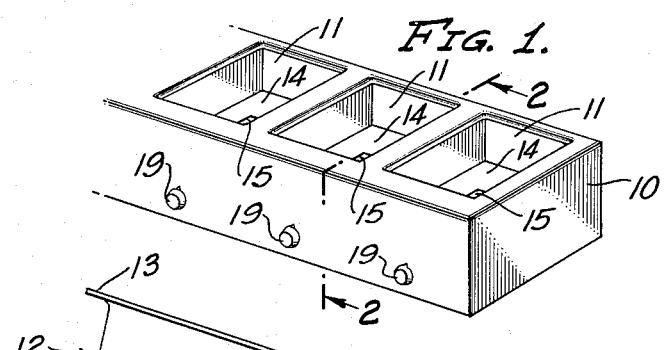
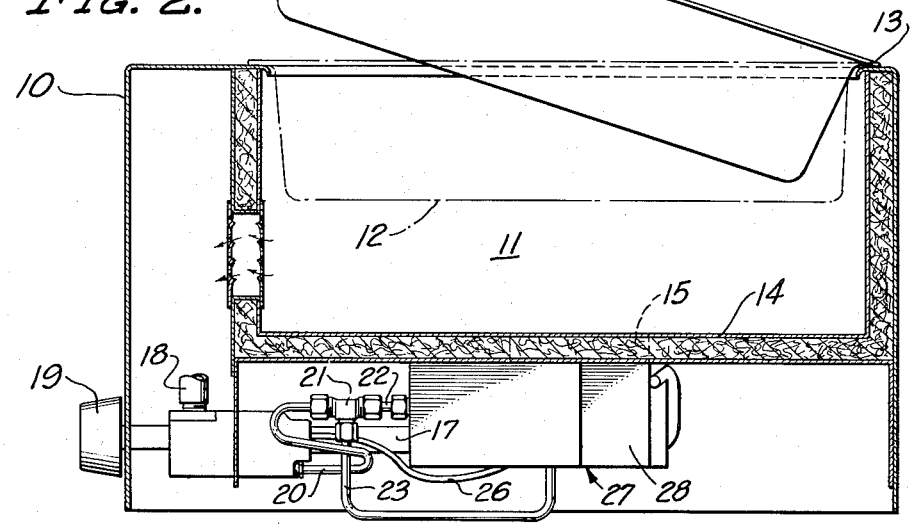
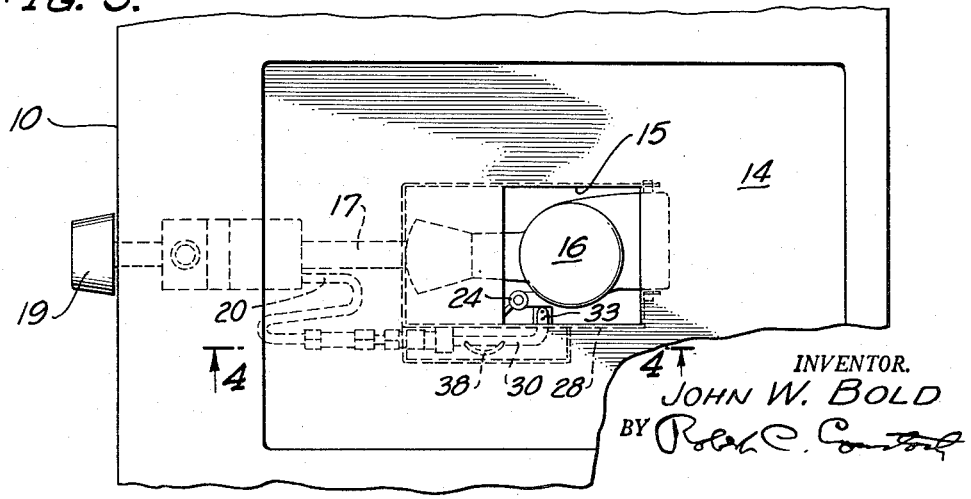
INVENTOR.
JOHN W. BOLD
BY
ATTORNEY Aug. 22, 1961 J. W. BOLD 2,997,040
PILOT FOR GAS OPERATED HOT FOOD TABLES
Filed March 30, 1959 2 Sheets-Sheet 2

INVENTOR.
JOHN W. BOLD
BY Robert C. Comstock
ATTORNEY

United States Patent Office 2,997,040
Patented Aug. 22, 1961

2,997,040
PILOT FOR GAS OPERATED HOT FOOD TABLES
John W. Bold, Los Angeles, Calif., assignor to National Cornice Works, Los Angeles, Calif., a corporation of California
Filed Mar. 30, 1959, Ser. No. 802,754
3 Claims. (Cl. 126—39)

This invention relates to a pilot which is particularly adapted for use on gas operated hot food tables of the type having removable food pans.

Hot food tables of the type described customarily have one or more open top compartments which are adapted to removably receive rectangular food pans. The bottom of each compartment is provided with an opening, beneath which is disposed a gas burner and a gas pilot for igniting the burner.

The food pans used in such tables customarily have peripheral flanges or lips which fit over the upper edges of the food compartment. The food pans customarily do not have any handles. In placing them in the food compartments, it is customary to place one end in position with its flange overlying the upper edge of one end of the food compartment and then let the other end of the pan drop down into position. The pan is also sometimes placed in the compartment by being moved to a position overlying the compartment and then dropped into place.

Regardless of what method is used, the pan completely closes off the top of the compartment with a rather sudden downward movement. This necessarily creates sudden air pressure in the food compartment beneath the pan as the displaced air is driven out. The resulting rush or blast of air very often blows out the pilot and may also possibly blow out the burner if the burner is turned on at the time.

The operator of the table is usually unaware of the fact that the pilot or pilot and burner have been extinguished, with the result that the food grows cold. This occurs because the visual inspection facilities customarily afforded for checking the continued operation of the pilot or burner are awkward and difficult to use and are consequently ignored.

If the unit is protected by a thermocouple or similar type of safety device, the gas supply will automatically be cut off shortly after the pilot is extinguished. If the unit has no such protective device, then a supply of gas will accumulate beneath the food pan, with the possibility of injury to the operator from a small explosion or burning when the pilot is lighted again.

This problem has existed in the industry for a considerable period of time. It is the principal object of my invention to provide a satisfactory solution to the problem. With my invention, the pilot is so constructed that it cannot be completely extinguished by dropping the food pan into the food compartment. My invention provides means whereby the pilot is immediately and automatically re-ignited after the pan is dropped into place. This occurs without any action being required on the part of the operator. My invention is adapted to be used on conventional hot food tables without requiring any substantial changes in their design or construction.

In essence, my invention contemplates a pilot construction in which the pilot is provided with a re-lighter tube, the rear end of which is connected to the pilot gas supply and the front end of which is provided with an orifice which is disposed adjacent one of the openings of the pilot. The re-lighter tube is in effect a by-pass which parallels the pilot supply tube. The gas which flows out of the orifice at the free end of the re-lighter tube is ignited and burns along with the pilot. The re-lighter tube is preferably so disposed that its forward end is shielded from the rush or blast of air which results from dropping the food pan into place.

If the pilot is extinguished by a blast of air, the flame at the end of the re-lighter tube is not extinguished because it is shielded. It is not extinguished by air which passes through the pilot supply tube because this air does not pass through the re-lighter tube. After the air flow has passed through the pilot supply tube, the gas supply to the pilot openings is immediately re-established and these openings are re-ignited by the flame at the forward end of the re-lighter tube.

It is accordingly an object of my invention to provide a pilot construction which will burn continuously and which cannot be extinguished by placing the food pans in position. It is among the further objects of my invention to provide a pilot construction having all of the advantages and benefits of the structure set forth above.

While my pilot construction is particularly adapted for use in gas operated hot food tables, in which use it satisfies a long existing and pressing need, it is, of course, also capable of use in other gas operated devices as well.

My invention also comprises such other objects, advantages and capabilities as will later more fully appear and which are inherently possessed by my invention.

While I have shown in the accompanying drawings preferred embodiments of my invention, it should be understood that the same are susceptible of modification and change without departing from the spirit of my invention.

Figure 5:
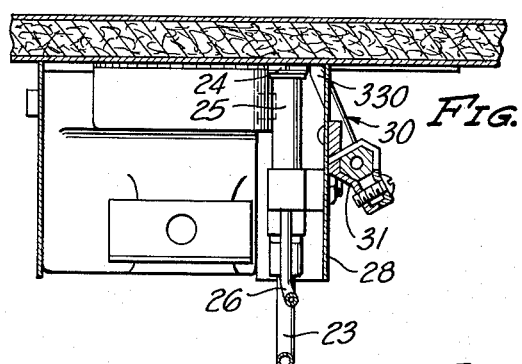
Figure 7:
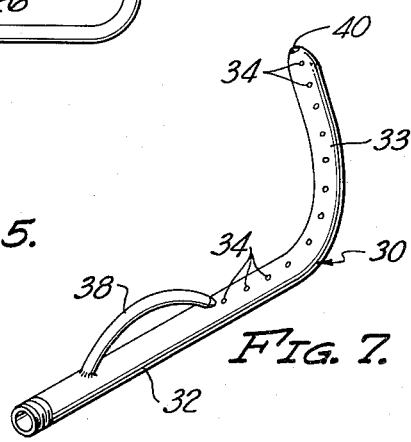
Figure 6:
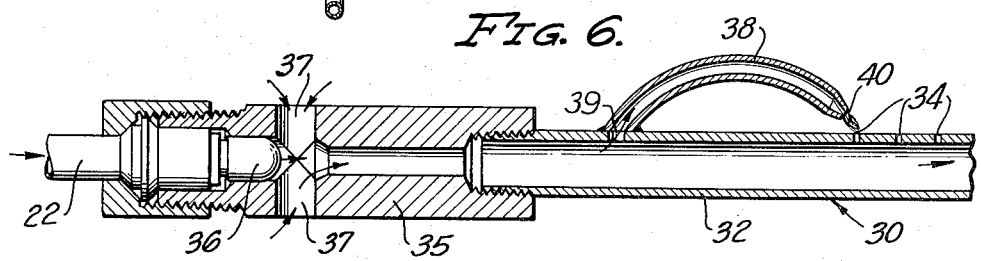
Figure 8:
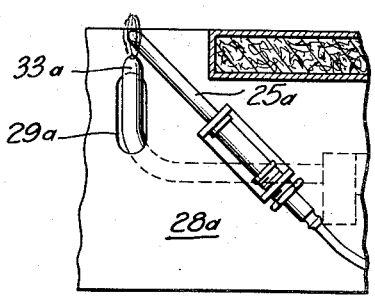

Referring to the drawings:
FIG. 1 is a perspective view of a portion of a typical hot food table having open top compartments for removably receiving food pans;
FIG. 2 is an enlarged sectional view of the same taken on line 2—2 of FIG. 1, with a pan shown in solid lines in position for dropping into the compartment and in dotted lines in the position to which it is dropped;
FIG. 3 is a top plan view of the bottom of one of the food compartments;
FIG. 4 is a sectional view of the same, taken on line 4—4 of FIG. 3;
FIG. 5 is a sectional view taken on line 5—5 of FIG. 4;
FIG. 6 is an enlarged sectional view of the rear portion of the runner pilot assembly;
FIG. 7 is a perspective view of the runner pilot including the re-lighter tube;
FIG. 8 is a fragmentary elevational view of an alternative embodiment of my invention in which a thermocouple is used with the runner pilot and without a separate pilot.

A preferred embodiment which has been selected to illustrate my invention comprises a hot food table 10 having a plurality of open top compartments 11, each of which is adapted to removably receive and hold a hot food pan 12. The food pan 12 is provided with peripheral flanges or lips 13 which fit over the upper edges of the compartments 11 in order to hold the pans 12 in position within the upper part of the compartments 11. When in such position, the pans 12 extend completely across and close off the top of the compartments 11.

Each of the compartments 11 is provided with a flat bottom 14, which is provided with a central square opening 15, beneath which is mounted a conventional gas burner 16. The burner 16 is connected to a burner supply tube 17, which supplies gas from a gas supply tube 18, the flow of gas being regulated by a manually operated control 19. A pilot supply tube 20 is directly connected to the gas supply tube 18 and is not regulated by the control 19. The pilot supply tube 20 is connected by means of a T coupling 21 to a runner pilot supply tube 22 and a thermocouple pilot supply tube 23.

The thermocouple pilot supply tube 23 supplies gas to a thermocouple which is conventional in structure and operation. It includes a thermocouple pilot 24 which heats a thermocouple 25, causing the generation of a small amount of thermoelectric current, which flows back through wiring contained in a tube 26. This current holds open a valve (not shown) to permit the continued flow of gas from the gas supply tube 18. If the thermocouple pilot 24 is extinguished, the supply of thermoelectric current is cut off and the valve automatically closes to cut off the flow of gas to the burner 16 and its pilots.

The burner 16 is housed within a rectangular burner housing 27, which is disposed beneath the bottom 14 of the compartment 11. The burner housing 27 includes a vertically directed side wall 28 which is closed except for a small oval-shaped opening 29. An elongated runner pilot 30 is mounted on the side wall 28 by a bracket assembly 31. The runner pilot 30 includes a straight portion 32 and an end portion 33 which is curved so that its free end extends at substantially a right angle to the straight portion 32. The end portion 33 extends through the opening 29 in side wall 28 and terminates adjacent the openings of the burner 16.

The runner pilot 30 has a plurality of small spaced openings 34 which begin on the straight portion and extend to and include the tip of the end portion 33. One end of the straight portion 32 of the runner pilot 30 is screw threadedly connected to one end of a mixer 35. The opposite end of the mixer 35 is screw threadedly connected to the pilot supply tube 22. The mixer 35 includes a jet 36 for ejecting gas which is mixed with air drawn through openings 37, the resulting mixture of air and gas being directed into the runner pilot 30.

The runner pilot 30 is provided with an arcuate relighter tube 38, which is connected at one end to the straight portion 32 through an opening 39 which is disposed toward the mixer 35 rearwardly from the first of the openings 34. The relighter tube 38 has a free end having an opening 40 therein. The opening 40 is disposed above and directed toward the first of the openings 34 in the runner pilot 30.

The mixture of gas and air from the mixer 35 flows through the straight portion 32 of the runner pilot 30 and also through the relighter tube 38.

Another embodiment of my invention is shown in FIG. 8 of the drawings. In this embodiment, all of the novel structure of the invention is the same. The only difference is that the separate pilot for the thermocouple has been eliminated. Instead, the thermocouple 25a is disposed so that its tip is adjacent the flame at the tip of the end portion 33a of the runner pilot. The end portion 33a extends through an opening 29a in a side wall 28a. The functioning of the thermocouple is conventional and is the same as that previously described. The only difference is that the runner pilot also acts as a pilot for the thermocouple 25a. My invention may also, of course, be used and will function equally well without any thermocouple whatsoever.

In use, gas is supplied to the runner pilot 30 through the gas supply tube 18, the pilot supply tube 20 and the runner pilot supply tube 22. This gas is mixed with air in the manner described and the mixture expelled from the openings 34 in the runner pilot 30. This mixture is ignited, resulting in a flame at each of the openings 34 and at the opening 40 at the tip of the relighter tube 38. The flame at the opening 40 is directed toward the adjacent opening 34. The burner 16 is ignited by operating the manual control 19, causing gas to flow to the burner 16 through the burner supply tube 17. When this gas is ejected by the burner 16, it is ignited by the flames at the openings 34 adjacent the tip of the runner pilot 30, which openings 34 are disposed adjacent the openings of the burner 16.

If a food pan 12 should happen to be dropped in the compartment 11, it will cause a blast or wave of air which will extinguish the flames at all of the openings 34 in the runner pilot 30. Some of the flames will be extinguished by the rush of air outside of the runner pilot 30 and the remainder will be extinguished by a concussion wave of air which moves back through the runner pilot 30 and cuts off their supply of gas.

The result is that all of the flames are extinguished except for the flame at the opening 40 at the forward tip of the relighter tube 38. This flame is not extinguished by the wave of air outside the runner pilot 30 because it is shielded by the side wall 28. The wave of air which passes through the opening 29 in the side wall 28 cannot reach the flame at the opening 40 and will not extinguish it. The flame at the opening 40 is not extinguished by the concussion wave of air which passes rearwardly along the runner pilot 30 because this wave of air does not enter the relighter tube 38. The wave of air passes quickly through the runner pilot 30 and out through the openings 37. The supply of gas (mixed with air) which is present in the relighter tube when this occurs is sufficient to keep the flame burning at the opening 40 until the wave of air has passed by and the supply of gas is resumed. When this occurs, the flame at the opening 40 re-ignites the flame at the adjacent opening 34 and the re-igniting is carried along the runner pilot 30 to all of the remaining openings 34. The runner pilot 30 is thus completely and automatically re-ignited and the possibility of a flameout condition is eliminated.

I claim:

1. In a gas operated hot food table of the type having a well-like recessed food compartment with an open top for removably receiving a hot food pan, in which the dropping of a food pan into said compartment closes off the open top and causes a concussive wave of air within said compartment, a burner opening in the bottom of said compartment and a gas operated burner disposed adjacent said burner opening, a burner housing disposed beneath said compartment, said burner being mounted within said burner housing, said burner housing having a vertically extending wall, said wall having a connecting opening therein, an elongated runner pilot having a plurality of longitudinally spaced flame openings, said runner pilot having an end portion extending through the connecting opening in said wall so that a portion of said runner pilot including at least one of said flame openings is disposed adjacent to said burner, said runner pilot having a straight portion extending at substantially a right angle with respect to said end portion, said straight portion being disposed adjacent to said wall and extending along said wall away from said connecting opening, a relighter tube carried by the straight portion of said runner pilot, said relighter tube extending in substantially the same direction as said straight portion, one end of said relighter tube being connected to said straight portion, said relighter tube having a flame opening at the other end thereof, said flame opening being disposed above and directed toward one of the flame openings in said runner pilot, said flame opening at the end of said relighter tube being shielded by said wall from the concussive air waves within said food compartment, the flame at the end of said relighter tube being adapted to re-ignite the flames of said runner pilot upon their extinguishment by concussive air waves caused by dropping a food pan into said food compartment.

2. In a gas operated hot food table of the type having a well-like recessed food compartment with an open top for removably receiving a hot food pan, in which the dropping of a food pan into said compartment closes off the open top and causes a concussive wave of air within said compartment, a burner opening in the bottom of said compartment and a gas operated burner disposed adjacent said burner opening, a vertically directed wall disposed adjacent said burner, said wall having a connecting opening therein, an elongated runner pilot having a plurality of longitudinally spaced flame openings, said runner pilot having an end portion extending through the connecting opening in said wall so that a portion of said runner pilot including at least one of said flame openings is disposed adjacent to said burner, said runner pilot having a portion disposed adjacent to said wall and extending along said wall away from said connecting opening, a relighter tube carried by said runner pilot, said relighter tube substantially paralleling said runner pilot, one end of said relighter tube being connected to said runner pilot, said relighter tube having a flame opening at the other end thereof, said flame opening being disposed adjacent one of the flame openings in said runner pilot, said flame opening at the end of said relighter tube being spaced laterally away from the connecting opening in said wall and being shielded by said wall from concussive air waves within said food compartment, the flame at the end of said relighter tube being adapted to re-ignite the flames of said runner pilot upon their extinguishment by concussive air waves caused by dropping a food pan into said food compartment.

3. In a gas operated hot food table of the type having a well-like recessed food compartment with an open top for removably receiving a hot food pan, in which the dropping of a food pan into said compartment closes off the open top and causes a concussive wave of air within said compartment, a burner opening in the bottom of said compartment and a gas operated burner disposed adjacent said burner opening, a wall disposed adjacent said burner opening, said wall having a connecting opening therein, a runner pilot having a plurality of spaced flame openings, said runner pilot having a portion extending through the connecting opening in said wall so that at least one of said flame openings is disposed adjacent to said burner, said runner pilot having a portion extending a substantial distance away from the connecting opening in said wall, a relighter tube connected to said runner pilot, said relighter tube having a flame opening disposed adjacent one of the flame openings in said runner pilot, said flame opening of said relighter tube being spaced a substantial distance away from the connecting opening in said wall and being shielded by said wall from the concussive air waves within said food compartment, the flame of said relighter tube being adapted to re-ignite the flames of said runner pilot upon their extinguishment by the concussive air waves resulting from dropping a food pan into said food compartment.

References Cited in the file of this patent

UNITED STATES PATENTS

| | | |
|---|---|---|
| 734,201 | Thornton | July 21, 1903 |
| 2,286,766 | Sherman | June 16, 1942 |
| 2,845,056 | Chambers | July 29, 1958 |